United States Patent [19]

Kobayashi et al.

[11] Patent Number: 4,598,678

[45] Date of Patent: Jul. 8, 1986

[54] INTAKE SYSTEM OF AN INTERNAL COMBUSTION ENGINE

[75] Inventors: Nobuyuki Kobayashi; Toshimitsu Ito, both of Toyota, Japan

[73] Assignee: Toyota Jidosha Kabushiki Kaisha, Toyota, Japan

[21] Appl. No.: 729,461

[22] Filed: May 1, 1985

[30] Foreign Application Priority Data

May 7, 1984 [JP] Japan .................. 59-089234

[51] Int. Cl.⁴ .................. F02F 1/42; F02M 51/00
[52] U.S. Cl. .................. 123/306; 123/478; 123/489; 123/188 M
[58] Field of Search .................. 123/188 M, 306, 478, 123/480, 486, 489, 492, 494, 440, 438; 364/431.05

[56] References Cited

U.S. PATENT DOCUMENTS

| | | | |
|---|---|---|---|
| 4,109,615 | 8/1978 | Asano | 123/440 |
| 4,178,883 | 12/1979 | Herth | 123/440 |
| 4,240,389 | 12/1980 | Shimazaki | 123/492 |
| 4,250,858 | 2/1981 | Jeenicke et al. | 123/480 |
| 4,269,156 | 5/1981 | Drellishak | 123/478 |
| 4,327,691 | 5/1982 | Moser | 123/478 |
| 4,359,991 | 11/1982 | Stumpp et al. | 123/478 |
| 4,372,278 | 2/1983 | Smith | 123/557 |
| 4,379,332 | 4/1983 | Busser et al. | 364/431.05 |
| 4,383,514 | 5/1983 | Fiala | 123/481 |
| 4,387,429 | 6/1983 | Yamauchi et al. | 364/431.05 |
| 4,391,253 | 7/1983 | Ito | 123/478 |
| 4,440,119 | 4/1984 | Kobayashi et al. | 123/492 |
| 4,454,846 | 6/1984 | Suzuki et al. | 123/489 |
| 4,467,749 | 8/1984 | Maeda | 123/188 M |
| 4,478,190 | 10/1984 | Kawai | 123/478 |
| 4,480,606 | 11/1984 | Kato et al. | 123/188 M |
| 4,485,775 | 12/1984 | Kanda et al. | 123/188 M |
| 4,509,485 | 4/1985 | Hasegawa | 123/489 X |
| 4,526,153 | 7/1985 | Hasegawa et al. | 123/480 |
| 4,528,961 | 7/1985 | Katoh et al. | 123/480 X |

FOREIGN PATENT DOCUMENTS

0143108 8/1983 Japan .

*Primary Examiner*—W. R. Wolfe
*Attorney, Agent, or Firm*—Cushman, Darby & Cushman

[57] ABSTRACT

An engine having a swirl control valve in the intake port. When the engine is operating at a low speed, a lean air-fuel mixture is fed into the engine cylinder, and a swirl control valve is closed in order to create a swirl motion in the combustion chamber. When a predetermined time elapses after the engine operating state is changed from the low speed-light load state to the low speed-heavy load state, the vacuum chamber of an actuator actuating the swirl control valve is opened to the outside air and, thereby, the swirl control valve is forced to open to the maximum extent. At the same time, the air-fuel mixture fed into the engine cylinder is changed to an air-fuel mixture of an approximately stoichiometric air-fuel ratio from the lean air-fuel mixture.

15 Claims, 17 Drawing Figures

INTAKE SYSTEM OF AN INTERNAL COMBUSTION ENGINE

BACKGROUND OF THE INVENTION

1. Field of Invention

The present invention relates to an intake system of an internal combustion engine.

2. Description of the Related Art

U.S. Pat. No. 4,485,775 discloses an engine having a helically-shaped intake port, which can create a strong swirl motion in the combustion chamber when the engine is operating at a low speed and to obtain a high volumetric efficiency when the engine is operating at a high speed. This helically-shaped intake port includes a helical portion, an inlet passage portion tangentially connected to the helical portion, and a bypass passage connecting the inlet passage portion to the helix terminating portion of the helical portion. A swirl control valve actuated by an actuator is arranged in the bypass passage. The actuator includes a vacuum chamber and an atmospheric pressure chamber, the chambers being separated by a disphragm. This disphragm is connected to the swirl control valve. The vacuum chamber of the actuator is connected to the intake manifold via a check valve, which permits only the outflow of air from the vacuum chamber to the intake manifold.

When the engine is operating under a heavy load at a high speed, the vacuum chamber of the actuator is caused to open to the outside air so that the swirl control valve opens the bypass passage to the maximum extent. Contrary to this, when the engine is operating at a low speed, the vacuum chamber of the actuator is disconnected from the outside air and connected to only the intake manifold via the check valve.

When the engine is operating at a low speed under a light load, a great vacuum is produced in the intake manifold. At this time, since the check valve opens, a great vacuum is also produced in the vacuum chamber and, as a result, the swirl control valve is caused to close the bypass passage. The entire air flows into the helical portion from the inlet passage portion of the intake port and, thus, a strong swirl motion is created in the combustion chamber.

Since the check valve opens only when the level of vacuum in the intake manifold becomes greater than that of vacuum in the vacuum chamber, the vacuum chamber of the actuator is maintained at the maximum vacuum produced in the intake manifold as long as the vacuum chamber is not caused to open to the outside air. Consequently, even if the engine operating state is changed to one where the level of vacuum in the intake manifold is low after the engine is operated at a low speed under a heavy load, since the level of vacuum in the vacuum chamber of the actuator is maintained at the maximum vacuum produced in the intake manifold, the swirl control valve theoretically remains closed. That is, when the engine operating state is changed to the heavy load-low speed operating state from the light load-low speed operating state, the swirl control valve theoretically remains closed.

However, actually, since air leaks into the vacuum chamber of the actuator via, for example, the check valve, the level of vacuum in the vacuum chamber of the actuator gradually decreases. Consequently, if the engine operates at a low speed under a heavy load for a long time, it is impossible to maintain the swirl control valve at the closed position and, thus, the swirl control valve opens. In an engine using an air-fuel mixture having an approximately stoichiometric air-fuel ratio, if the swirl control valve opens when the engine is operating under a heavy load at a low speed, no particular problem occurs. However, in an engine using an extremely lean air-fuel mixture, if the swirl control valve opens when the engine is operating under a heavy load at a low speed, since swirl motion of the air-fuel mixture is weakened, the combustion deteriorates. As a result, a problem occurs in that good drivability cannot be obtained.

SUMMARY OF THE INVENTION

An object of the present invention is to provide an internal combustion engine, equipped with a swirl control valve, which is capable of obtaining a good drivability even if an extremely lean air-fuel mixture is used.

According to the present invention, there is provided an internal combustion engine including an intake passage; a swirl control valve arranged in the intake passage for creating a swirl motion in a combustion chamber when the swirl control valve is closed; an actuator having a vacuum chamber isolated from the outside air by a diaphragm which is connected to the swirl control valve, the actuator closing the swirl control valve when the level of vacuum in the vacuum chamber becomes greater than a predetermined level; valve means arranged between the intake passage and the vacuum chamber for confining vacuum in the vacuum chamber to close the swirl control valve when the engine is operating at a low speed, the valve means causing the vacuum chamber to open to the outside air for opening the swirl control valve when the engine is operating at a high speed; fuel supply means arranged in the intake passage for forming a lean air-fuel mixture therein; a vacuum sensor arranged in the intake passage for detecting the absolute pressure therein; means for calculating the elapsed time after the absolute pressure exceeds a predetermined pressure under a state where the engine is operating at a low speed; and control means controlling the valve means and the fuel supply means for causing the vacuum chamber to open to the outside air to open the swirl control valve and for changing an air-fuel mixture formed by the fuel supply means to an air-fuel mixture of an approximately stoichiometric air-fuel ratio from a lean air-fuel mixture when the elapsed time exceeds a predetermined time.

BRIEF DESCRIPTION OF THE DRAWINGS

The present invention may be more fully understood from the description of a preferred embodiment of the invention set forth below, together with the accompanying drawings, in which.

DESCRIPTION OF THE PREFERRED EMBODIMENTS

Figure 1:
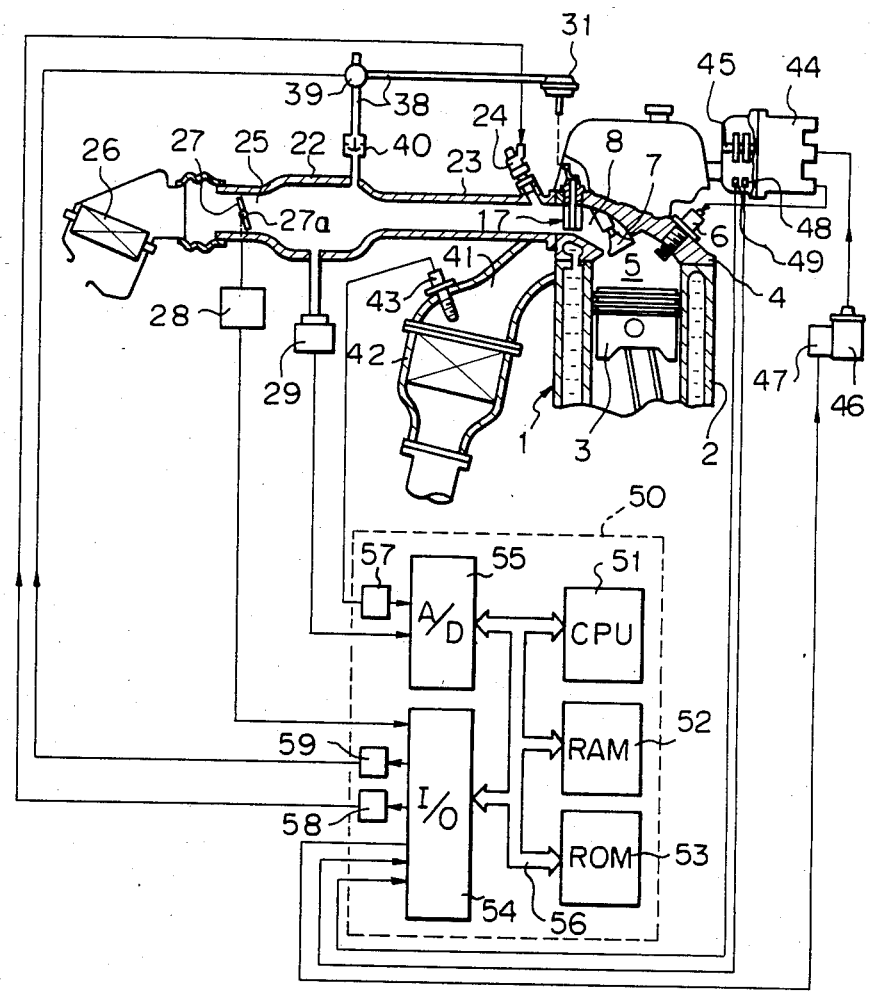
FIG. 1 is a cross-sectional side view of an entire engine.
Figure 2:
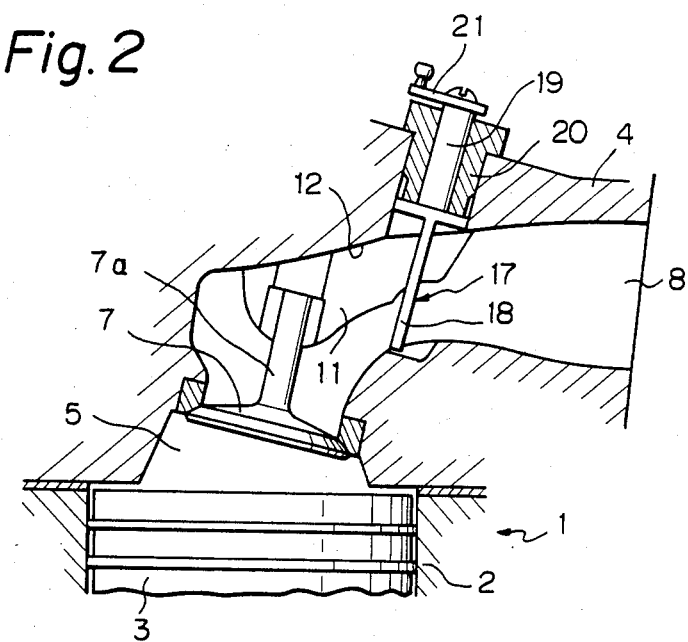
FIG. 2 is a cross-sectional side view of the cylinder head.
Figure 3:
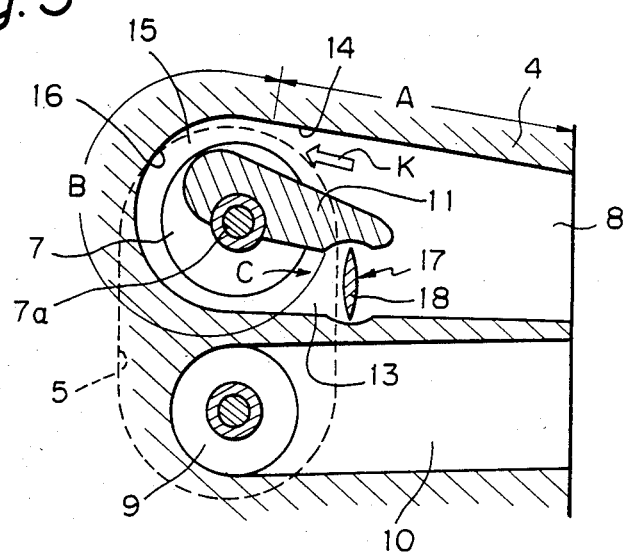
FIG. 3 is a cross-sectional plan view of the cylinder head.
Figure 4:
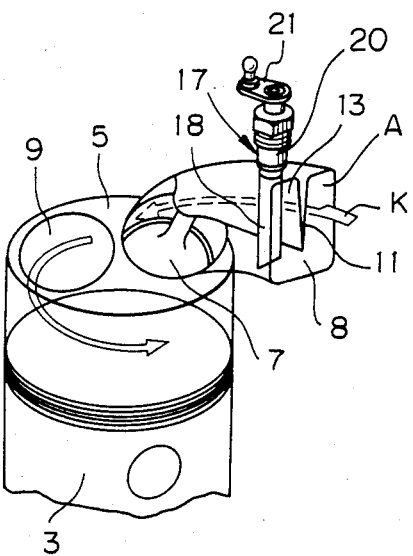
FIG. 4 is a schematically illustrated perspective view of the engine.

Referring to FIGS. 1 through 4, reference numeral 1 designates an engine body, 2 a cylinder block, 3 a piston reciprocally movable in the cylinder block 2, and 4 a cylinder head fixed onto the cylinder block 2; 5 designates a combustion chamber, 6 a spark plug arranged in the combustion chamber 5, 7 an intake valve, and 8 a helically-shaped intake port; 9 designates an exhaust valve, and 10 an exhaust port. A downwardly projecting separating wall 11 is formed on the upper wall 12 of the intake port 8, and a space is formed between the lower face of the separating wall 11 and the bottom wall of the intake port 8. This separating wall 11 passes the side of the valve stem 7a and extends along the axis of the intake port 8. An inlet passage portion A, a helical portion B, and a bypass passage 13 are formed in the intake port 8 by the separating wall 11. The inlet passage portion A is tangentially connected to the helical portion B, and the bypass passage 13 is branched off from the inlet passage portion A and connected to the helix terminating portion C of the helical portion B. As illustrated in FIG. 3, the transverse width of the inlet passage portion A formed between the side wall 14 of the intake port 8 and the separating wall 11 decreases toward the helical portion B, and a narrow passage portion 15 is formed between the cylindrical side wall 16 of the helical portion B and the separating wall 11. A swirl control valve 17 is arranged in the bypass passage 13. This swirl control valve 17 includes a thin walled valve body 18 and a valve shaft 19, and the valve shaft 19 being rotatably supported by a valve holder 20 fixed onto the cylinder head 4. As illustrated in FIG. 2, an arm 21 is fixed onto the upper end of the valve shaft 19.

As illustrated in FIG. 1, the intake port 8 is connected to a surge tank 22 via a branch pipe 23, and a fuel injector 24 is arranged in the branch pipe 23. This fuel injector 24 is connected to the fuel pump (not shown) driven by the engine. The surge tank 22 is connected to the outside air via an intake air duct 25 and an air filter element 26, and a throttle valve 27 actuated in response to the depression of the accelerator pedal (not shown) is arranged in the intake air duct 26. A throttle switch 28 is connected to the valve shaft 27a of the throttle valve 27 and made ON when the degree of opening of the throttle valve 27 exceeds a predetermined degree, for example, 20 degrees through 30 degrees. The throttle switch 28 is connected to an electronic control unit 50.

A vacuum sensor 29 is attached to the surge tank 22 and produces an output voltage which is proportional to the absolute pressure produced in the surge tank 22. This vacuum sensor 29 is connected to the electronic control unit 50.

Figure 5:
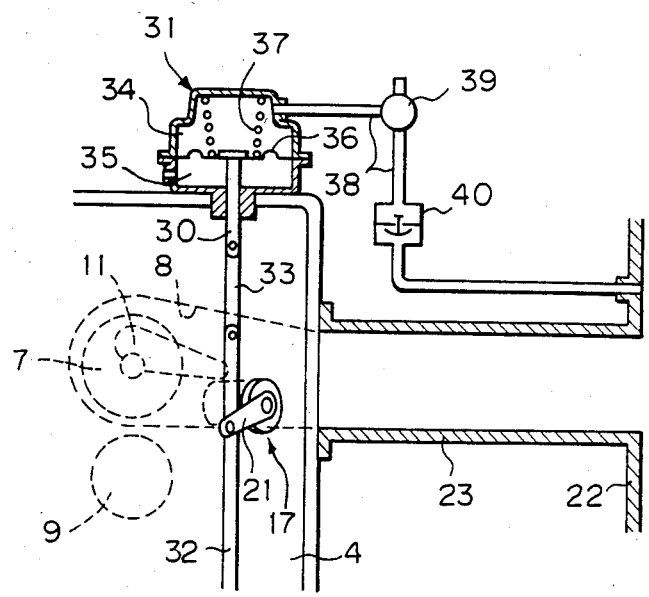
FIG. 5 is a plan view, partly in cross-section, of a portion of the cylinder head.

As illustrated in FIGS. 1 and 5, the arm 21 of the swirl control valve 17 is connected to a control rod 30 of an actuator 31 via a connecting rod 32 and a link member 33. The actuator 31 including a vacuum chamber 34 and an atmospheric pressure chamber 35, which chambers are separated by a disphragm 36. The control rod 30 is connected to the diaphragm 36, and a compression spring 37 for biasing the diaphragm is arranged in the vacuum chamber 34. The vacuum chamber 34 is connected to the surge tank 22 via a conduit 38. A solenoid valve 39, which is able to open to the outside air, is arranged in the conduit 38 and, in addition, a check valve 40 which permits only the outflow of air from the vacuum chamber 34 to the surge tank 22 is arranged in the conduit 22. The solenoid valve 39 is connected to the electronic control unit 50 and is thus controlled in response to the output signal of the electronic control unit 50.

When the vacuum chamber 34 of the actuator 31 is connected to the surge tank 22 via the solenoid valve 39, vacuum acts in the vacuum chamber 34. At this time, the check valve 40 opens only when the level of vacuum in the surge tank 22 is greater than that of vacuum in the vacuum chamber 34. Consequently, the level of vacuum in the vacuum chamber 34 is maintained at the maximum vacuum produced in the surge tank 22. When the level of vacuum in the vacuum chamber 34 exceeds a predetermined level, the diaphragm 36 moves toward the vacuum chamber 34 and, as a result, the swirl control valve 17 closes the bypass passage 13, as illustrated in FIG. 3. At this time, air introduced into the inlet passage portion A of the intake port 8 flows into the helical portion B, as illustrated by the arrow K in FIGS. 3 and 4. At this time, since the inlet passage portion A is formed so that the transverse width thereof decreases toward the helical portion B, as mentioned above, the velocity of the air is increased. Then, the air flows along the cylindrical side wall 16 of the helical portion B and, thus, a strong swirl motion is created.

When the vacuum chamber 34 of the actuator 31 is caused to be open to the outside air via the solenoid valve 39, the diaphragm 36 moves toward the atmospheric pressure chamber 35 due to the spring force of the compression spring 37. As a result, the swirl control valve 17 opens the bypass passage 13. Consequently, at this time, part of the air flows into the helical portion B via the bypass passage 13 having a small flow resistance. This part of the air comes into head-on collision with the air stream swirling along the cylindrical side wall 16 of the helical portion B and, thus, the swirl motion is weakened. As mentioned above, when the swirl control valve 17 opens to the maximum extent, the swirl motion is weakened and, in addition, the flow area of the intake port 8 is increased. As a result, a high volumetric efficiency can be obtained.

Figure 6:
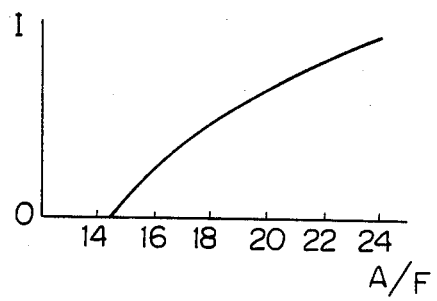
FIG. 6 is a diagram illustrating the output current of a lean sensor.

Referring to FIG. 1, an exhaust manifold 41 is connected to the exhaust port 10 (FIG. 3), and a catalytic converter 42 containing a catalyzer therein is connected to the exhaust manifold 41. Hydro-carbons (HC), carbon-monoxide (CO), and nitrogen-oxides (NOx) are purified in the catalytic converter 42. A lean sensor 43 is arranged in the exhaust manifold 41 and connected to the electronic control unit 50. The lean sensor 43 produces an output current which is proportional to the oxygen concentration in the exhaust gas, as illustrated in FIG. 6. In FIG. 6, the ordinate indicates the output current I of the lean sensor 43, and the abscissa indicates the air-fuel ratio (A/F). The construction and the operation of the lean sensor 43 is known (for example, Japanese Unexamined Patent Publication (Kokai) No. 58-143108) and, therefore, a description of the construction and the operation of the lean sensor 43 is omitted.

As illustrated in FIG. 1, the engine 1 is equipped with a distributor 44 having a rotor 45 driven by the engine 1. The distributor 44 is connected to the electronic control unit 50 via an ignition coil 46 and an igniter 47. The electronic control unit 50 produces an ignition signal. This ignition signal is fed into the igniter 47 and, then, the primary current of the ignition coil 46 is controlled by the ignition signal. The high voltage produced in the ignition coil 46 is applied to the spark plug 6 of each cylinder via the distributor 44 and, thus, the spark plug 6 produces a spark at a time determined by the ignition signal. A pair of crank angle sensors 48, 49 are arranged in the distributor 44 and connected to the electronic control unit 50. The crank angle sensor 48 produces an output pulse every time the crank shaft of the engine 1 rotates by 30 degrees, and the crank angle 49 produces an output pulse every time the crankshaft of the engine 1 rotates by 720 degrees.

The electronic control unit 50 is constructed as a digital computer and includes a control processing unit (CPU) 51 carrying out the arithmetic and logic processing, a random-access memory (RAM) 52, a read-only memory (ROM) 53 storing a predetermined control program and arithmetic constant therein, an input/output (I/O) port 54, and an analog-digital (A/D) converter 55 incorporating a multiplexer. The CPU 51, the RAM 52, the ROM 53, the I/O port 54, and the A/D converter 55 are interconnectd to each other via a bidirectional bus 56. The throttle switch 28 is connected to the I/O port 54, and the output signal of the throttle switch 28 is input into the I/O port 54. The vacuum sensor 29 is connectd to the A/D converter 55, and the output signal of the vacuum sensor 29 is input into the A/D converter 55. The lean sensor 43 is connected to the A/D converter 55 via a current-voltage converting circuit 57 of the electronic control unit 50. The output current of the lean sensor 43 is converted to corresponding voltage in the current-voltage converting circuit 57 and, then, the voltage thus converted is input into the A/D converter 55. In the A/D converter 55, the output voltage of the vacuum sensor 29 or the output voltage of the current-voltage converting circuit 57 is selectively converted to a corresponding binary code in response to the indication signal issued from the CPU 51. The binary code thus obtained, that is, data representing the absolute pressure PM in the surge tank 22 and data corresponding the output current LNSR of the lean sensor 42, are stored in the RAM 52.

The crank angle sensors 48 and 49 are connected to the I/O port 54, and the output pulses of the crank angle sensors 48 and 49 are input into the I/O port 54. Then, these output pulses are input into the CPU 51 and, for example, the engine speed NE is calculated by measuring the number of the output pulses which the crank angle sensor 48 produces per unit time. The engine speed NE thus calculated is stored in the RAM 52.

The fuel injector 24 and the solenoid valve 39 are connected to the I/O port 54 via corresponding drive circuits 58 and 59, and the igniter 47 is connected to the I/O port 54. An injection signal is fed into the fuel injector 24 from the CPU 51 via the I/O port 54 and the drive circuit 58. The solenoid of the fuel injector 24 is energized for a time period determined by the injection signal and, thus, fuel is intermittently injected from the fuel injector 24 into the intake port 8. A swirl control drive signal is fed into the solenoid valve 39 from the CPU 51 via the I/O port 54 and the drive circuit 59. The solenoid valve 39 is energized for a time period determined by the swirl control drive signal. As mentioned previously, the ignition signal is fed into the igniter 47 from the CPU 51 via the I/O port 54.

In the engine according to the present invention, three kinds of air-fuel mixtures, that is, an extremely lean air-fuel mixture (for example, air-fuel ratio of about 22:1), a relatively lean air-fuel mixture (for example, air-fuel ratio of 17:1 through 18:1), and an air-fuel mixture having an approximately stoichiometric air-fuel ratio are used. Roughly speaking, when the engine is operating at a high speed, the air-fuel mixture of an approximately stoichiometric air-fuel ratio is fed into the engine cylinders. When the engine is operating at a low speed, the extremely lean air-fuel mixture or the relatively lean air-fuel mixture is fed into the engine cylinders. At this time, it is determined by the position of the throttle valve 27 whether the extremely lean air-fuel mixture or the relatively lean air-fuel mixture should be fed into the cylinders. That is, when the throttle switch 28 is made ON, that is, when the degree of opening of the throttle valve 27 exceeds a predetermined degree, for example, 20 degrees to 30 degrees, the relatively lean air-fuel mixture is fed into the cylinders. Contrary to this, when the throttle switch 28 is made OFF, that is, when the degree of opening of the throttle valve 27 becomes smaller than the predetermined degree, the extremely lean air-fuel mixture is fed into the cylinders. In addition, when the air-fuel mixture of an approximately stoichiometric air-fuel ratio is fed into the cylinders, the swirl control valve 17 is caused to open to the maximum extent and, when the extremely lean air-fuel mixture or the relatively lean air-fuel mixture is fed into the cylinders, the swirl control valve 17 is caused to be closed. If the swirl control valve 17 is closed, a strong swirl motion is created in the combustion chamber 5 and, as a result, the burning velocity is increased. Consequently, at this time, even if the lean air-fuel mixture is fed into the cylinders, stable combustion can be obtained. The above-mentioned operation is a basic operation.

In the present invention, as hereinafter described, if the engine is operated at a low speed under a heavy load for a long time, the swirl control valve 17 is caused to open, and the air-fuel mixture having an approximately stoichiometric air-fuel ratio is fed into the cylinders even when the engine is operating at a low speed.

Figure 7:
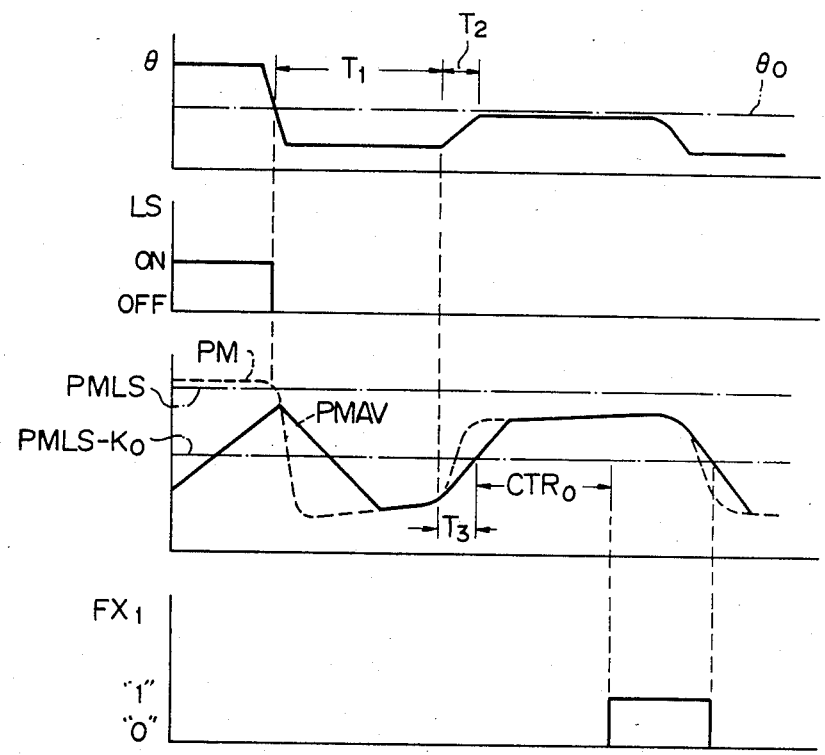
FIG. 7 is a time chart illustrating changes in absolute pressure, a relax value, and flag.

FIG. 7 illustrates the degree of opening $\theta$ of the throttle valve 27, the output signal LS of the throttle switch 28, the absolute pressure PM in the surge tank 22, the relax value PMAV used in the flow charts hereinafter described, and the flag $FX_1$ used in the flow charts hereinafter described.

Figure 8:
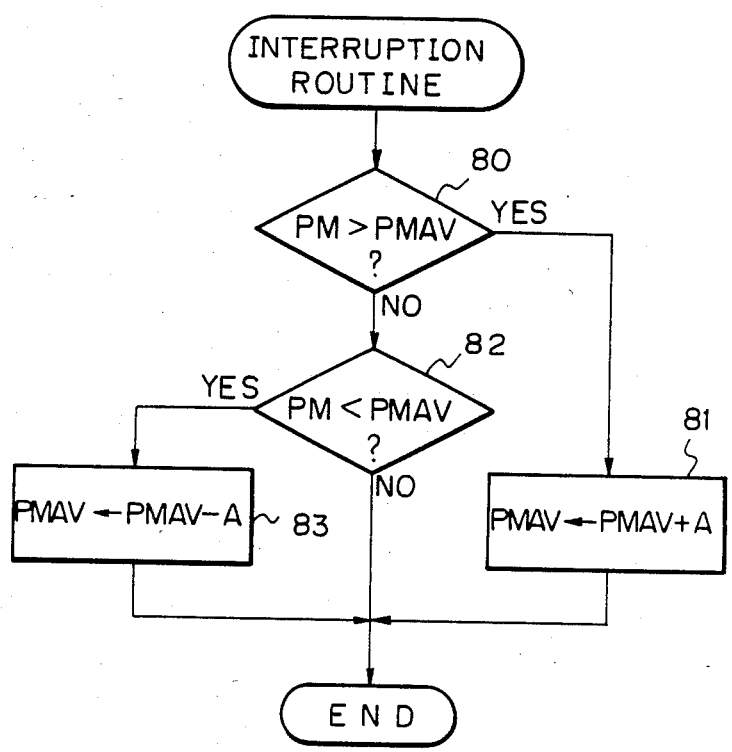
FIG. 8 is a flow chart for calculating the relax value.

FIG. 8 illustrates a processing routine carrying out the calculation of the relax value PMAV. This routine is processed by sequential interuptions which are executed at predetermined time intervals. Referring to FIG. 8, initially, it is determined at step 80 whether the absolute pressure PM is larger than the relax value PMAV. If PM>PMAV, the routine goes to step 81, and a fixed value A is added to PMAV. If PM≦PMAV, the routine goes to step 82, and it is determined whether PM is smaller than PMAV. If PM<PMAV, the routine goes to step 83, and the fixed value A is subtracted from PMAV. Consequently, as illustrated in FIG. 7, when the absolute pressure PM in the surge tank 22 is higher than the relax value PMAV, the relax value PMAV slowly increases and approaches the absolute pressure PM and, when the absolute pressure PM is lower than the relax value PMAV, the relax value PMAV slowly decreases and approaches the absolute pressure PM. That is, the relax value PMAV is slowly changed so as to approach the absolute pressure PM. FIG. 8 illustrates an example of methods of calculating the relax value PMAV and, therefore, any other method can be adopted.

Figure 9:
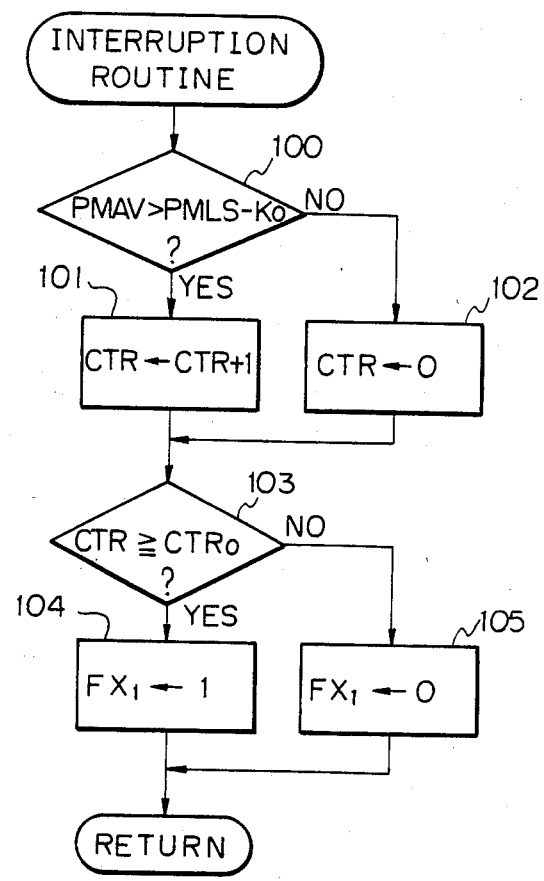
FIG. 9 is a flow chart for selectively setting or resetting the flag.

FIG. 9 illustrates a processing routine carrying out the set and reset of the flag $FX_1$. This routine is processed by sequential interruptions which are executed at predetermined time intervals. Referring to FIG. 9, initially, at step 100, it is determined whether the relax value PMAV is larger than a reference value PMLS-$K_0$. PMLS indicates the absolute pressure PM in the surge tank 11 at the moment when the throttle switch 27 is made OFF, that is, when the degree of opening of the throttle valve 27 is smaller than a predetermined degree. This predetermined degree is 20 degrees through 30 degrees and indicated by the line $\theta_0$ in FIG. 7. As illustrated in FIG. 7, when the degree of opening $\theta$ of the throttle valve 27 becomes smaller than the predetermined degree $\theta_0$, the throttle switch 27 is made OFF as illustrated by LS in FIG. 7. The absolute pressure PM in the surge tank 22 at a moment when the throttle switch 27 is made OFF is stored as PMLS in the RAM 52. The value of the PMLS is, of course, lower than the atmospheric pressure, but is near the atmospheric pressure. The reference value PMLS-$K_0$ is obtained by subtracting a fixed value $K_0$ from PMLS. Consequently, during the time the degree of opening of the throttle valve 27 is maintained below the predetermined degree $\theta_0$, the reference value PMLS-$K_0$ is maintained at a fixed value which is lower than the atmospheric pressure. If where the engine is equipped with a detector for detecting the atmospheric pressure, the reference value may be calculated by subtracting a fixed value K ($>K_0$) from the atmospheric pressure. That is, it will be understood that the reference value PMLS-$K_0$ represents a value which is lower than the atmospheric pressure by a predetermined pressure. Consequently, if the atmospheric pressure is changed, the reference value PMLS-$K_0$ is accordingly changed, but the difference between the atmospheric pressure and the reference value PMLS-$K_0$ is maintained approximately constant. In addition, if the engine is equipped with another throttle switch which is made ON when the throttle valve 27 opens to the maximum extent, the absolute pressure PM in the surge tank 22, which is produced when the other throttle switch is made ON, may be used as PMLS. However, in a normal engine operating state, the throttle switch 28 used in the present invention has a greater chance of being made OFF as compared with the above-mentioned other throttle switch. Consequently, by using the throttle switch 28, the chance of changing the value of PMLS in accordance with a change in the atmospheric pressure is increased and, therefore, the accuracy of control can be improved.

Turning to FIG. 9, as mentioned above, in step 100, it is determined whether the relax value PMAV is larger than the reference value PMLS-$K_0$. If PMAV>PMLS-$K_0$, the count value CTR is incremented by one in step 101. If PMAV≦PMLS-$K_0$, zero is put into the count value CTR in step 102. Then, in step 103, it is determined whether the count value CTR is equal to or larger than a predetermined fixed count value $CTR_0$. If CTR≧$CTR_0$, in step 104, 1 is put into the flag $FX_1$, that is, the flat $FX_1$ is set. If CTR<$CTR_0$, in step 105, zero is put into the flag $FX_1$, that is, the flag $FX_1$ is reset.

Referring to FIG. 7, in the time period $T_1$, the degree of opening $\theta$ of the throttle valve 27 is small and, thus, the engine is operating under a light load at a low speed. At this time, the swirl control valve 17 is closed, and the extremely lean air-fuel mixture is fed into the cylinders. Then, in the time period $T_2$, the throttle valve 27 is slightly opened. As a result, the absolute pressure PM in the surge tank 22 increases, and the relax value PMAV gradually increases. When the relax value PMAV exceeds the reference value PMLS-$M_0$, the increment of the count value CTR is started as described with reference to FIG. 9. After this, when the count value CTR becomes equal to the fixed count value $CTR_0$, that is, when a fixed time period indicated by $CTR_0$ in FIG. 7 elapses after the relax value PMAV exceeds the reference value PMLS-$K_0$, the flag $FX_1$ is set. This fixed time period is several minutes through ten odd minutes. Before the flag $FX_1$ is set, the swirl control valve 17 remains closed, and the extremely lean air-fuel mixture is fed into the cylinders. However, when the flag $FX_1$ is set, the swirl control valve 17 is caused to open to the maximum extent, and the air-fuel mixture of an approximately stoichiometric air-fuel ratio is fed into the cylinders, as hereinafter described. During this time, the flag $FX_1$ is set, the swirl control valve 17 remains open, and the air-fuel mixture fed into the cylinders is maintained at an approximately stoichiometric air-fuel ratio. When the throttle valve 17 is rotated toward the closed positon, and when the relax valve PMAV decreases below the reference value PMLS-$K_0$, zero is put into the count value CTR as described with reference to FIG. 7 and, thus, the flag $FX_1$ is reset. At this time, the swirl control valve 17 is again closed, and the extremely lean air-fuel mixture is fed into the cylynders.

When the throttle valve 27 is slightly opened in the time period $T_2$ of FIG. 7, the absolute pressure PM increases. However, at this time, as mentioned previously with reference to FIG. 5, since the check valve 40 is closed, the level of vacuum in the vacuum chamber 34 of the actuator 31 is maintained at a great vacuum level. Consequently, the swirl control valve 17 remains closed. Nevertheless, if the absolute pressure PM increases, air gradually leaks into the vacuum chamber 34 from the surge tank 22 via the check valve 40 and, thus, the level of vacuum in the vacuum chamber 34 gradually declines. Consequently, the swirl control valve 17 is caused to open a little while after the throttle valve 17 is slightly opened. However, at this time, the extremely lean air-fuel mixture is fed into the cylinders. Consequently, at this time, if the swirl control valve 17 is opened, since the swirl motion is weakened, the combustion deteriorates. However, in the present invention, before the swirl control valve 17 is opened due to the decrease in the level of vacuum in the vacuum chamber 34, the swirl control valve 17 is forced to open to the maximum extent and, at the same time, the air-fuel mixture fed into the cylinders is changed from the extremely lean air-fuel mixture to the air-fuel mixture of an approximately stoichiometric air-fuel ratio. Consequently, good combustion can be obtained and, thus, good drivability can be obtained.

As will be understood from the above description, $CTR_0$ in FIG. 7 indicates the time period capable of maintaining the swirl control valve 17 at the closed position. The greater the level of vacuum in the vacuum chamber 34 before the throttle valve 17 is opened, the longer the time period capable of maintaining the swirl control valve 17 at the closed position. Consequently, in the present invention, the relax value PMAV is slowly changed so that the time period $T_3$ (until the relax value PMAV exceeds the reference value $PMLS-K_0$ after the throttle valve 17 is opened) illustrated in FIG. 7 becomes long as the level of vacuum in the surge tank 22 before the throttle value 17 is opened becomes great.

FIGS. 10 through 14 are flow charts for the control of the swirl control valve 17 and the air-fuel ratio.

Figure 10:
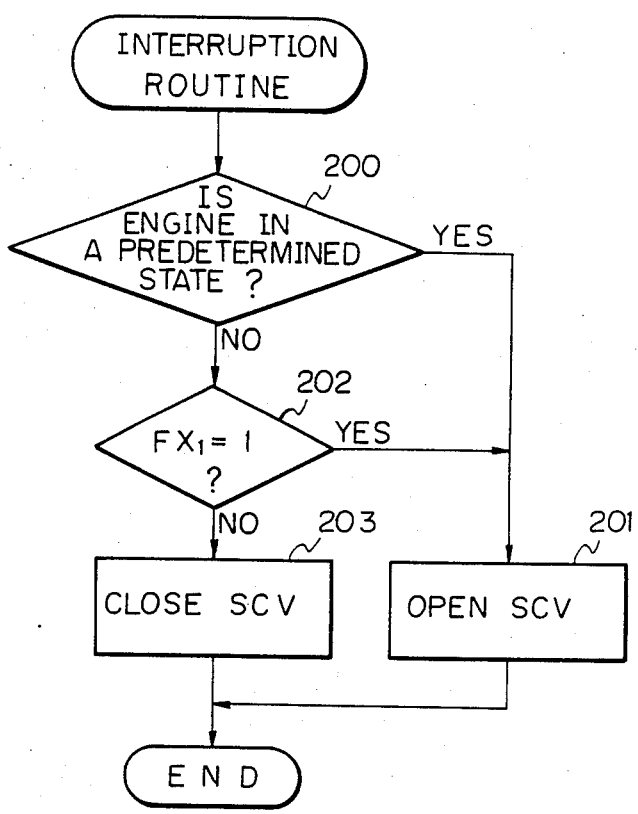
FIG. 10 is a flow chart for controlling an opening operation of a swirl control valve.

FIG. 10 illustrates the processing routine for controlling the swirl control valve 17. This routine is processed by sequential interruptions which are executed at predetermined time intervals. Referring to FIG. 10, initially, at step 200, it is judged whether the engine is in a predetermined state in which the swirl control valve 17 should be opened. This predetermined state is as follows.

(1) when the engine speed is higher than 2800 rpm
(2) when the throttle valve 27 is open to the maximum extent
(3) when the starting operation of the engine is carried out When at least one of the above states (1), (2), and (3) is satisfied, the routine goes to step 201. At step 201, the solenoid valve 39 is energized, and the vacuum chamber 34 of the actuator 31 is caused to open to the outside air. As a result, the swirl control valve (SCV) 17 is opened to the maximum extent. When the engine is not in a predetermined state in which the swirl control valve 17 should be opened, the routine goes to step 202. At step 202, it is determined whether the flag $FX_1$ is set. If the flag $FX_1$ is not set, the routine goes to step 203, and the solenoid valve 39 is deenergized. As a result, the vacuum chamber 34 of the actuator 31 is connected to the surge tank 22 and, thus, the swirl control valve (SCV) 17 is closed. Contrary to this, if the flag $FX_1$ is set, the routine goes to step 201, and the swirl control valve (SCV) 17 is opened to the maximum extent. As mentioned above, it will be understood that, if the flag $FX_1$ is set, the swirl control valve 17 is opened to the maximum extent.

Figure 11:
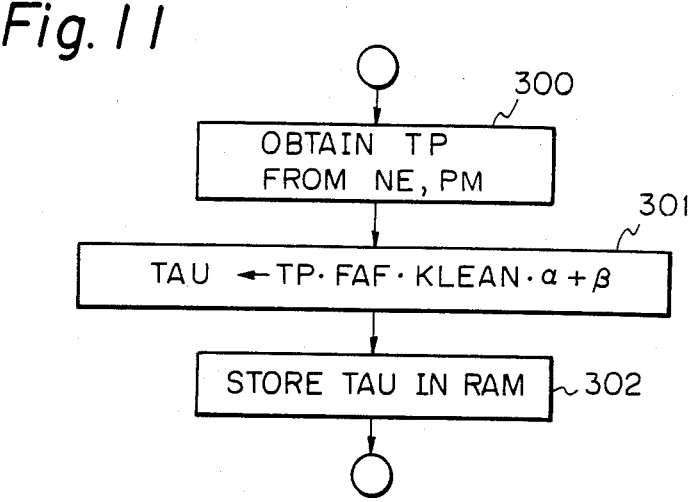
FIG. 11 is a flow chart for calculating a fuel injection pulse width.

FIG. 11 illustrates a processing routine for calculating the pulse width TAU of the injection signal. This routine is executed in a main routine every time the crankshaft relates by a predetermined angle, for example, 180 degrees. Referring to FIG. 11, at step 300, the basic pulse width TP of the injection signal is obtained from the engine speed NE and the absolute pressure PM. Data indicating the relationship among the basic pulse width TP, the engine speed NE, and the absolute pressure PM is stored in the ROM 53 in the form of a data table. Thus, at step 300, the basic pulse width TP is obtained from the data stored in the ROM 53. Then, at step 301, the actual pulse width TAU of the injection signal is calculated from the following equation by using the basic pulse width TP, the air-fuel ratio feedback correction coefficient FAF, the lean correction coefficient KLEAN, and other correction coefficients $\alpha$ and $\beta$.

$$TAU = TP \cdot FAF \cdot KLEAN \, \alpha + \beta$$

FAF is a correction coefficient used for carrying out the closed loop control of the air-fuel ratio. FAF is calculated in the processing routine illustrated in FIG. 13. When open loop control of the air-fuel ratio is carried out, FAF is maintained 1.0.

CLEAN is a correction coefficient used for changing the desired air-fuel ratio to an air-fuel ratio which is on the lean side of the stoichiometric air-fuel ratio. KLEAN is calculated in the processing routine illustrated in FIG. 12. When the desired air-fuel ratio is the stoichiometric air-fuel ratio, KLEAN is maintained 1.0.

At step 302, the actual pulse width TAU is stored in the RAM 52. In the main routine processed by sequential interruptions which are executed every predetermined crank angle, the injection start time and the injection stop time are obtained from the actual pulse width TAU, and the injection signal is output into the I/O port 54 between the injection start time and the injection stop time. As a result, fuel is injected from the fuel injector 24.

Figure 12:
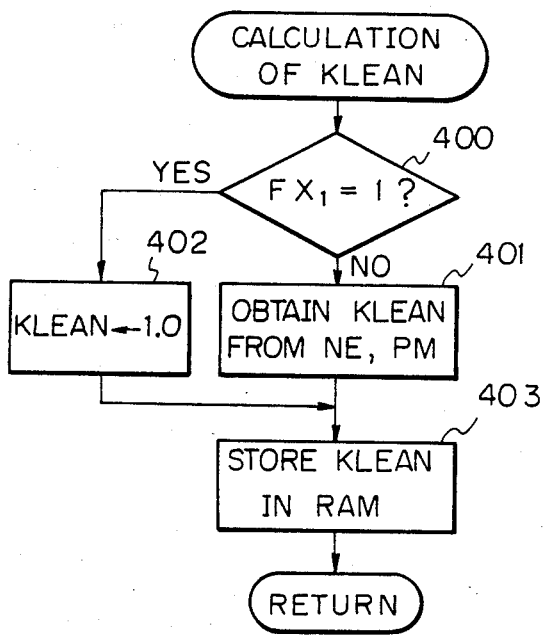
FIG. 12 is a flow chart for determining a correction coefficient KLEAN.
Figure 15:
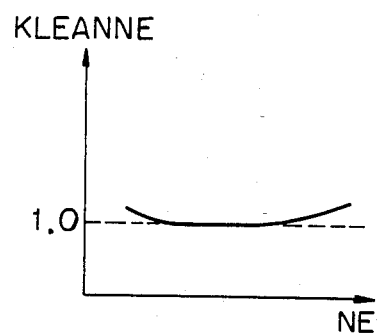
FIG. 15 is a diagram illustrating the relationship between a correction coefficient KLEANNE and the engine speed.
Figure 16:
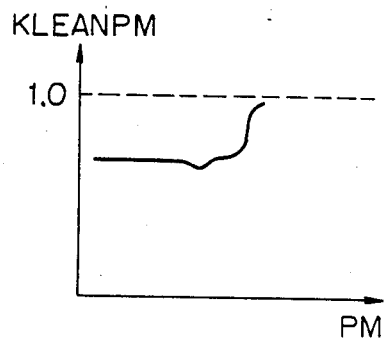
FIG. 16 is a diaphragm illustrating a relationship between a correction coefficient KLEANPM and the absolute pressure in the surge tank.

FIG. 12 illustrates a processing routine for calculating the lean correction coefficient KLEAN. This routine is executed when the processing routine illustrated in FIG. 12 is executed in the main routine. Referring to FIG. 12, initially, in step 400, it is determined whether the flag $FX_1$ is set. If the flag $FX_1$ is not set, the routine goes to step 401, and KLEAN is obtained from the engine speed NE and the absolute pressure PM. That is, data indicating the relationship between KLEANNE and the engine speed NE as illustrated in FIG. 15 is stored in the ROM 53, and data indicating the relationship between KLEANPM and the absolute pressure PM as illustrated in FIG. 16 is stored in the ROM 53. At step 401, KLEANNE is multiplied by KLEANPM and, thus, KLEAN (=KLEANNE·KLEANPM) is obtained. Then, the routine goes to step 403.

If the $FX_1$ is set, the routine goes to steps 402, and 1.0 is input into KLEAN. Then, at step 403, KLEAN is stored in the RAM 52.

Figure 13:
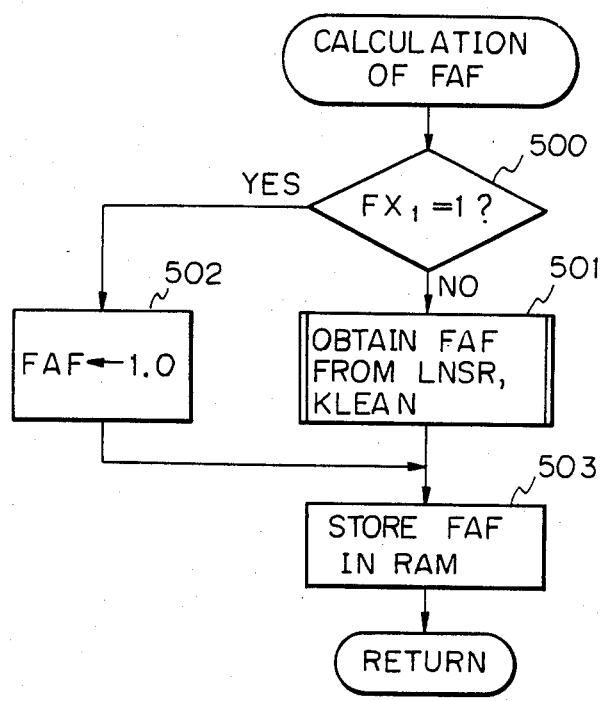
FIG. 13 is a flow chart for determining a correction coefficient FAF.
Figure 14:
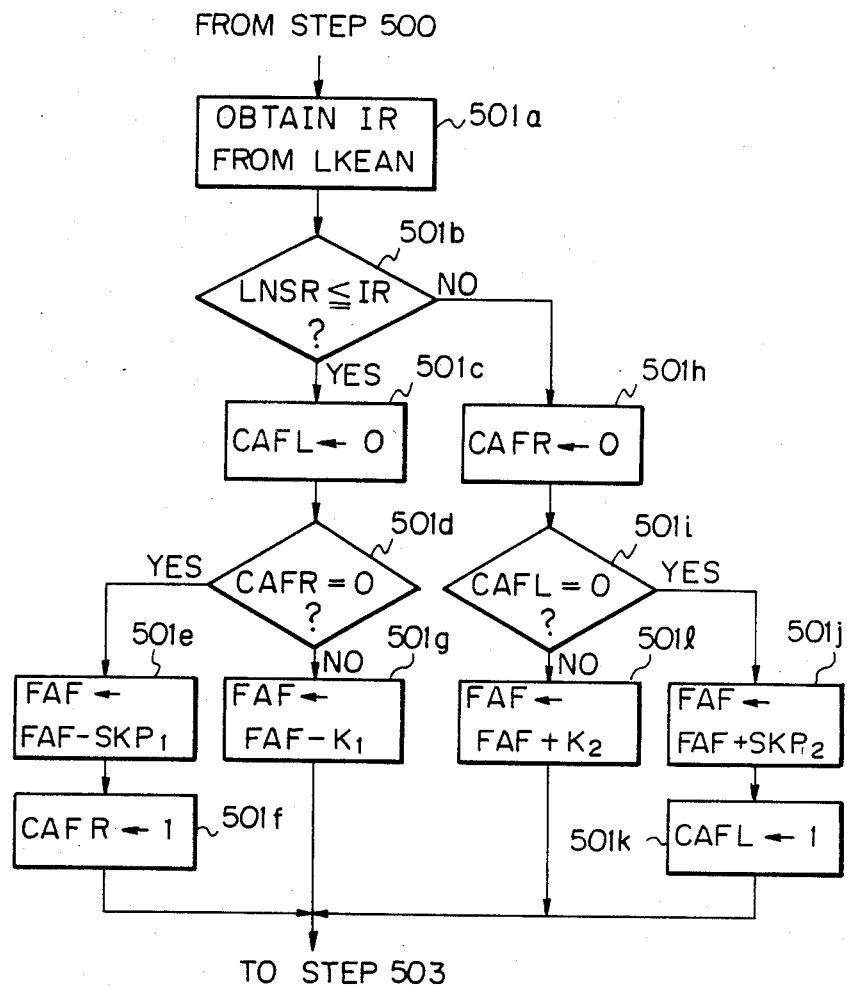
FIG. 14 is a flow chart for calculating the correction coefficient FAF.

FIG. 13 illustrates a processing routine for calculating the air-fuel ratio feedback correction coefficient FAF. This routine is executed when the processing routine illustrated in FIG. 12 is executed in the main routine. Referring to FIG. 13, initially, at step 500, it is determined whether the flag $FX_1$ is set. If the flag $FX_1$ is not set, the routine goes to step 501, and FAF is obtained from the output value LNSR of the lean sensor 43 and the lean correction coefficient KLEAN. FIG. 14 illustrates an example of the processing executed in step 501 of FIG. 13.

Figure 17:
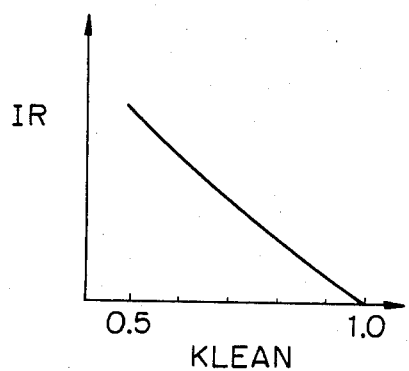
FIG. 17 is a diagram illustrating the relationship between the correction coefficient KLEAN and a reference current IR.

Referring to FIG. 14, initially, at the step 501a, a reference value IR is obtained from KLEAN. Data indicating the relationship between IR and KLEAN as illustrated in FIG. 17 is stored in the ROM 53. IR indicates the output value of the lean sensor 43, which corresponds to the desired lean air-fuel ratio represented by KLEAN. Consequently, by comparing the reference value IR with the actual output value of the lean sensor 43, it is possible to control the actual air-fuel ratio so that it becomes equal to the desired lean air-fuel ratio.

At step 501b, the output value of the lean sensor 43 is compared with the reference value IR representing the desired lean air-fuel ratio, that is, it is determined whether the actual air-fuel ratio is on the lean side or on the rich side of the desired lean air-fuel ratio. If LNSR≦IR, that is, if the actual air-fuel ratio is on the rich side of the desired lean air-fuel mixture, the routine goes to step 501C. In step 501C, the flag CAFL for the skip, which is used at step 501i, is reset. Then, at step 501d, it is determined whether the flag CAFL for the skip is reset. When the actual air-fuel ratio is changed to the rich side from the lean side of the desired lean air-fuel ratio, since the flag CAFR has been reset, the routine goes to step 501e. At step 501e, FAF is reduced by $SKP_1$. Then, at step 501f, the flag CAFR is set. Consequently, after this, when the routine goes to step 501d, it is determined that the flag CAFR is set and, thus, the routine goes to step 501g. At step 501g, FAF is reduced by $K_1$. $SKP_1$ and $K_1$ have a fixed value, and the value $SKP_1$ is considerably larger than that of $K_1$. That is, $SKP_1$ is used for instantaneously reducing FAF by a large value, that is, for carrying out the skip operation of FAF when the actual air-fuel ratio is changed from the lean side to the rich side of the desired lean air-fuel ratio. Contrary to this, $K_1$ is used for gradually reducing FAF, that is, for carrying out the integrating operation of FAF after the skip operation of FAF is completed.

If LNSR>IR, that is, when the actual air-fuel ratio is changed from the rich side to the lean side of the desired lean air-fuel ratio, the processing indicated by steps 501h through 501l is executed. The processing executed in steps 501h through 501l is almost the same as the processing executed in steps 501c through 501g, except that FAF is increased by $SKP_2$ and $K_2$. Consequently, the description regarding steps 501h through 501l is emitted.

Turning to FIG. 13, after FAF is obtained in step 501, the routine goes to step 503, and FAF is stored in the RAM 52. If the flag $FX_1$ is set, the routine goes to step 502 and 1.0 is put into FAF.

Consequently, when the flag $FX_1$ is set, both KLEAN and FAF become equal to 1.0. At this time, the control of the air-fuel ratio becomes open loop control, and an air-fuel mixture of an approximately stoichiometric air-fuel ratio is fed into the cylinders. In addition, as mentioned above, when the flag $FX_1$ is set, the swirl control valve 17 is caused to open to the maximum extent. Furthermore, when the flag $FX_1$ is set, the ignition timing is retarded.

According to the present invention, before the level of vacuum in the vacuum chamber of the actuator becomes smaller than a predetermined level which causes the swirl control valve to open, the swirl control valve is forced to open and, at the same time, the air-fuel mixture is changed from the lean air-fuel mixture to the air-fuel mixture of an approximately stoichiometric air-fuel ratio. As a result, it is possible to obtain stable combustion and thereby obtain good drivability.

While the invention has been described by reference to a specific embodiment chosen for purposes of illustration, it should be apparent that numerous modifications could be made thereto by those skilled in the art without departing from the basic concept and scope of the invention.

We claim:

1. An internal combustion engine comprising:
an intake passage;
a swirl control valve arranged in said intake passage for creating a swirl motion in a combustion chamber when said swirl control valve is closed;
an actuator having a vacuum chamber isolated from the outside air by a diaphragm which is connected to said swirl control valve, said actuator closing said swirl control valve when the level of vacuum in said vacuum chamber becomes greater than a predetermined level;
valve means arranged between said intake passage and said vacuum chamber for confining vacuum in said vacuum chamber to close said swirl control valve when said engine is operating at a low speed, said valve means causing said vacuum chamber to open to the outside air for opening said swirl control valve when said engine is operating at a high speed;
fuel supply means arranged in said intake passage for forming a lean air-fuel mixture therein;
a vacuum sensor arranged in said intake passage for detecting the absolute pressure therein;
means for calculating an elapsed time after said absolute pressure exceeds a predetermined pressure under a state where said engine is operating at a low speed; and
control means controlling said valve means and said fuel supply means for causing said vacuum chamber to open to the outside air to open said swirl control valve and for changing an air-fuel mixture formed by said fuel supply means to an air-fuel mixture of an approximately stoichiometric air-fuel ratio from a lean air-fuel mixture when said elapsed time exceeds a predetermined time.

2. An internal combustion engine according to claim 1, wherein said fuel supply means forms an air-fuel mixture of an approximately air-fuel ratio in said intake passage when said engine is operating at a high speed.

3. An internal combustion engine according to claim 1, further comprising a lean sensor arranged in an exhaust passage of said engine and detecting an air-fuel ratio, an air-fuel ratio of the lean air-fuel mixture being controlled in response to an output signal of said lean sensor so that it becomes equal to a desired lean air-fuel ratio.

4. An internal combustion engine according to claim 1, further comprising a spark plug arranged in the combustion chamber, the ignition timing of said spark plug being retarded when the air-fuel mixture is changed to an air-fuel mixture of an approximately stoichiometric air-fuel ratio from the lean air-fuel mixture.

5. An internal combustion engine according to claim 1, wherein said intake passage has a helically-shaped intake port comprising a helical portion, a substantially straight extending inlet passage portion tangentially connected to said helical portion, and a bypass passage branched off from said inlet passage portion and connected to a helix terminating portion of said helical portion, said swirl control valve being arranged in said bypass passage.

6. An internal combustion engine according to claim 5, wherein said intake port has a separating wall projecting downward from an upper wall of said intake port and extending along an axis of said intake port, said separating wall defining said helical portion, said inlet passage portion, and said bypass passage.

7. An internal combustion engine according to claim 1, wherein said valve means comprises a check valve arranged between said vacuum chamber and said intake passage and permitting only the outflow of air from said vacuum chamber to said intake passage, and a solenoid valve connected to said vacuum chamber and being able to open to the outside air for causing said vacuum chamber to open to the outside air.

8. An internal combustion engine according to claim 7, wherein said vacuum chamber is connected to said intake passage via a single conduit, and said check valve and said solenoid valve are arranged in said conduit.

9. An internal combustion engine according to claim 1, wherein said calculating means further calculates a relax value changed in response to a change in said absolute pressure and slowly approaching said absolute pressure, said calculating means starting the calculation of said elapsed time when said relax value exceeds said predetermined pressure.

10. An internal combustion engine according to claim 9, wherein said relax value is slowly incremented when said absolute pressure is higher than said relax value, and said relax value is slowly decremented when said absolute pressure is lower than said relax value.

11. An internal combustion engine according to claim 9, wherein, when said relax value becomes lower than said predetermined pressure after said relax value exceeds said predetermined pressure, the air-fuel mixture formed by said fuel supplying means is changed to a lean air-fuel mixture from an air-fuel mixture of an approximately stoichiometric air-fuel ratio, and vacuum is confined in said vacuum chamber for closing said swirl control valve.

12. An internal combustion engine according to claim 1, further comprising a throttle valve arranged in said intake passage, and a throttle switch connected to said throttle valve and producing an output signal which indicates whether the degree of opening of said throttle valve is larger than a predetermined degree.

13. An internal combustion engine according to claim 12, wherein said fuel supply means is controlled in response to the output signal of said throttle switch and forms a relatively lean air-fuel mixture or an extremely lean air-fuel mixture which is leaner that said relatively lean air-fuel mixture when the degree of opening of said throttle valve is larger or smaller than said predetermined degree, respectively.

14. An internal combustion engine according to claim 12, wherein said predetermined pressure is determined based on said absolute pressure produced at a moment when the degree of opening of said throttle valve is smaller than said predetermined degree.

15. An internal combustion engine according to claim 14, wherein said predetermined pressure is determined by subtracting a fixed value from said absolute pressure produced at said moment.

* * * * *